(12) United States Patent
Kingery

(10) Patent No.: US 6,974,617 B2
(45) Date of Patent: Dec. 13, 2005

(54) MOTOR FLUID ABSORBENT PAD

(75) Inventor: Gary L. Kingery, Cisne, IL (US)

(73) Assignee: New World Environmental Products, LLC, Salisbury, MD (US)

(*) Notice: Subject to any disclaimer, the term of this patent is extended or adjusted under 35 U.S.C. 154(b) by 0 days.

(21) Appl. No.: 10/876,447

(22) Filed: Jun. 28, 2004

(65) Prior Publication Data

US 2005/0003137 A1 Jan. 6, 2005

Related U.S. Application Data

(62) Division of application No. 10/345,934, filed on Jan. 17, 2003, now Pat. No. 6,780,489.

(51) Int. Cl.$^7$ .............................. B32B 3/02; B32B 3/10
(52) U.S. Cl. ........................... 428/48; 428/74; 428/76; 428/124; 428/126
(58) Field of Search ........................... 428/74, 76, 124, 428/126, 47, 48; 296/38; 180/69.1; 184/106

(56) References Cited

U.S. PATENT DOCUMENTS

| | | | |
|---|---|---|---|
| 3,932,322 A | | 1/1976 | Duchane |
| 4,272,514 A | | 6/1981 | Spence |
| 4,286,082 A | | 8/1981 | Tsubakimoto et al. |
| 4,381,783 A | | 5/1983 | Elias |
| 4,418,163 A | | 11/1983 | Murakami et al. |
| 4,484,661 A | * | 11/1984 | Evenson ..................... 184/106 |
| 4,500,670 A | | 2/1985 | McKinley et al. |
| 4,684,562 A | | 8/1987 | Hartkemeyer |
| 4,826,497 A | | 5/1989 | Marcus et al. |
| 5,149,335 A | | 9/1992 | Kellenberger et al. |
| 5,173,346 A | * | 12/1992 | Middleton ................... 428/53 |
| 5,419,956 A | | 5/1995 | Roe |
| 5,474,545 A | | 12/1995 | Chikazawa |
| 5,489,469 A | * | 2/1996 | Kobayashi et al. ......... 442/393 |

(Continued)

Primary Examiner—Alexander S. Thomas
(74) Attorney, Agent, or Firm—Birch, Stewart, Kolasch & Birch, LLP

(57) ABSTRACT

An absorbent pad for use in absorbing motor fluids, especially for use in absorbing and collecting motor fluids leaking from a motor/engine. The absorbent pad comprises a bottom liquid impermeable support layer, a layer of absorbent material and a top liquid permeable layer, wherein a portion of the top liquid permeable layer is bonded to a portion of the bottom liquid impermeable support layer with an adhesive strip thereby enclosing the absorbent material layer. In a preferred embodiment, the absorbent pad is prepared by a method comprising a step of forming at least one fold configuration selected from the group consisting of (A), (B) and (C) at a side of the absorbent pad, wherein: fold configuration (A) is formed by binding a portion of a bottom surface of the liquid permeable layer and a portion of a top surface of the liquid impermeable support layer with an adhesive strip; fold configuration (B) is formed by folding the liquid impermeable support layer around a side of the absorbent material layer and binding a portion of a top surface of the liquid impermeable support layer with an adhesive strip to a portion of a top surface of the liquid permeable layer; and fold configuration (C) is formed by partially draping the liquid permeable layer over the side of the absorbent layer, and binding a portion of the top surface of the liquid permeable layer with an adhesive strip to a portion of the top surface of the liquid impermeable support layer, wherein a midpoint of said adhesive strip is at a position along the side of the absorbent pad of at least $1/10^{th}$ the total distance from bottom to top of the pad as measured in a thickness direction T.

20 Claims, 1 Drawing Sheet

U.S. PATENT DOCUMENTS

| | | | |
|---|---|---|---|
| 5,505,718 A | 4/1996 | Roe et al. | |
| 5,536,264 A | 7/1996 | Hsueh et al. | |
| 5,549,590 A | 8/1996 | Suskind et al. | |
| 5,601,542 A | 2/1997 | Melius et al. | |
| 5,630,376 A | 5/1997 | Ochi et al. | |
| 5,643,239 A | 7/1997 | Bodford et al. | |
| 5,716,840 A * | 2/1998 | Kahler et al. | 435/264 |
| 5,763,331 A * | 6/1998 | Demhartner | 442/68 |
| 5,922,163 A | 7/1999 | Helynranta et al. | |
| 6,063,981 A | 5/2000 | Wehner et al. | |
| 6,284,362 B1 | 9/2001 | Takai et al. | |
| 6,293,935 B1 | 9/2001 | Kimura et al. | |
| 6,369,292 B1 | 4/2002 | Strack et al. | |
| 6,375,645 B1 | 4/2002 | Nishida et al. | |
| 6,376,011 B1 | 4/2002 | Reeves et al. | |
| 6,387,495 B1 | 5/2002 | Reeves et al. | |
| 6,450,996 B1 | 9/2002 | Otsubo | |
| 6,455,114 B1 | 9/2002 | Goldhirsch et al. | |
| 2002/0038109 A1 | 3/2002 | Williams | |
| 2002/0058920 A1 | 5/2002 | Toyoda et al. | |
| 2002/0128625 A1 | 9/2002 | Tanaka et al. | |
| 2002/0147435 A1 | 10/2002 | Coles et al. | |
| 2002/0150761 A1 | 10/2002 | Lange et al. | |
| 2002/0156441 A1 | 10/2002 | Sawyer et al. | |

\* cited by examiner

MOTOR FLUID ABSORBENT PAD

This application is a Divisional Application of application Ser. No. 10/345,934, filed Jan. 17, 2003, now U.S. Pat. No. 6,780,489. The entire contents of which are herein incorporated by reference.

FIELD OF THE INVENTION

The present invention relates to an absorbent pad especially for use in absorbing waste fluids from motors and engines, such as industrial machines, sump pumps, radiators, fork lifts, hydraulic cylinders, gear boxes, transportation vehicles, or the like.

BACKGROUND OF THE INVENTION

The largest market for absorbent pads is for their use in absorbing human excreta. For example, U.S. Pat. No. 5,763,331 teaches the use of an absorbent composite for applications such as diapers, mattress pads, sanitary napkins and incontinence briefs. The absorbent composite is characterized by a main support layer, a layer of absorbent material positioned on the main support layer, the absorbent material comprised of a superabsorbent granular component, and at least a first portion of the superabsorbent granular component being intimately bonded to the main support layer. This absorbent composite further comprises an adhesive for gluing at least the first portion of the superabsorbent granular component to the main support layer. An important property of the absorbent composite is the ability of the absorbent material to keep the absorbed liquid away from the surface of the absorbent composite to give the impression of being dry on the inside even after being wetted.

U.S. Pat. No. 5,489,469 teaches an absorbent composite useful as an absorbent article such that the absorption of a liquid and the retention of the absorbed liquid are required, e.g., hygienic and medical supplies such as sanitary napkins and disposable diapers and a water retaining agent for the agricultural and forestry field and a freshness retaining agent for vegetables. The absorbent composite can be prepared by sandwiching between upper and lower sheets of paper or nonwoven fabric, a sheet absorber comprising a pulverized pulp or cellulose powder and a liquid absorbent composite. The ends of the paper or nonwoven fabrics are sealed with an adhesive.

A problem associated with the running and maintenance of motors and engines, is that they leak oil and other fluids which are difficult to clean. The inventive absorbent pad is positioned near a motor/engine to catch these waste fluids originating from the motor/engine. The inventive absorbent pad is uniquely constructed to have the ability to clean surfaces soiled with leaked fluids from the motor/engine.

SUMMARY OF THE INVENTION

Under the above-mentioned circumstances, the present inventors made extensive and intensive studies with a view to developing an absorbent pad especially for absorbing waste fluids originating from motors and engines, such as industrial machines, sump pumps, radiators, fork lifts, hydraulic cylinders, gear boxes, transportation vehicles, or the like (hereinafter motor fluids).

The absorbent pad is excellent in capacity, rate and power of absorbing not only with respect to low-viscosity liquids such as transmission fluid and coolants but also with respect to high-viscosity liquids such oil. As a result, the present inventors have found that a pad having excellent absorbency can be obtained by constructing the absorbent pad with at least a liquid impermeable support layer onto which is applied a layer of absorbent material and on top of the absorbent material layer is a liquid permeable layer, wherein an outer portion of the support layer is bound to an outer portion of the liquid permeable layer with an adhesive strip enclosing the absorbent material.

BRIEF DESCRIPTION OF THE DRAWINGS

While the specification concludes with claims particularly pointing out and distinctly claiming the present invention, it is believed the present invention will be better understood from the following description in conjunction with the accompanying drawings in which:

DETAILED DESCRIPTION OF THE INVENTION

Figure 1:
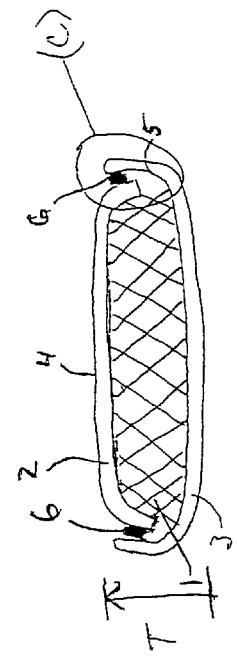
FIG. 1 is a cross section of a pad showing the separate layers.

The inventive method is now described with reference to the figures. The absorbent pad is prepared with a liquid impermeable support layer 3 on the bottom and onto which is applied a layer of absorbent material 1, and on top of the absorbent material layer 1 is a liquid permeable layer 2. Although not critical to the function of the inventive absorbent pad, an adhesive layer can be used between the absorbent material layer 1 and the liquid impermeable support layer 3 and/or between the absorbent material layer 1 and the liquid permeable layer 2.

The liquid permeable layer 2 and the liquid impermeable support layer 3 are connected at essentially the perimeter of each layer by a strip of adhesive. The width of the adhesive strip can vary depending on the strength of the adhesive. Preferably the width is less than 8 cm, more preferably the width is less then 4 cm. The recitation herein of "essentially the perimeter" means that the adhesive strip is near the edge of the layer. The adhesive strip can be at an absolute edge of the layer, or there can be excess material from layer 2 and/or layer 3 of up to 3 cm (as measured from the edge of the adhesive strip) on a side opposite to the side where the absorbent material is located.

The manner in which the liquid permeable layer 2 and the liquid impermeable support layer 3 are folded to allow for an adhesive connection can vary.

Figure 2:
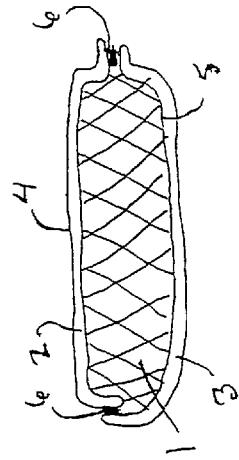
FIG. 2 is a top view of the pad.
Figure 6:
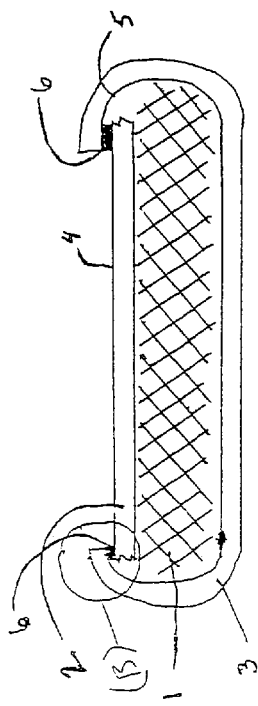
FIG. 6 is a cross section of the pad of FIG. 2 along line VI–VI'.

In the pad of FIG. 2, there are two fold configurations shown. A cross section of the pad of FIG. 2 is given in FIG. 6, which shows a side view of the fold configuration (A) of the leading edge 7 and the trailing edge 8. In fold configuration (A), an adhesive strip 6 is located between a portion of a bottom side 9 of the liquid permeable layer 2 and a portion of the top side 5 of the liquid impermeable support layer 3.

Figure 3:
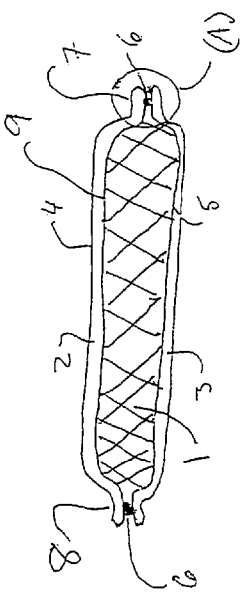
FIG. 3 is a cross section of the pad of FIG. 2 along line III–III'.

A second cross section of the pad of FIG. 2 is given in FIG. 3, which shows side view of the fold configuration (B)

of the side edges 10. The support layer 3 is folded around the absorbent material layer 1 and essentially an outer perimeter of the support layer 3 is bound by an adhesive strip 6 to essentially an outer perimeter of a top surface 4 of the liquid permeable layer 2. The adhesive strip 6 can be first applied to the top surface 4 of the liquid permeable layer 2 and/or to the inner surface 5 of the liquid impermeable support layer 3 prior to crimping the two layers together. Preferably, the adhesive strip 6 is first applied to the top surface 4 of the liquid permeable layer 2.

Figure 4:
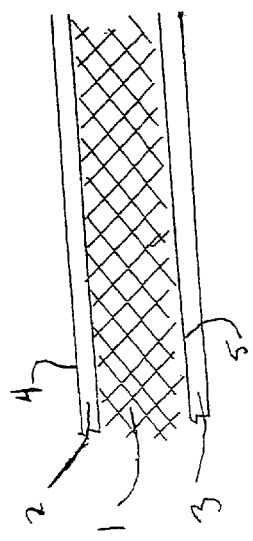
FIG. 4 is a cross section of a pad showing the separate layers.
Figure 5:
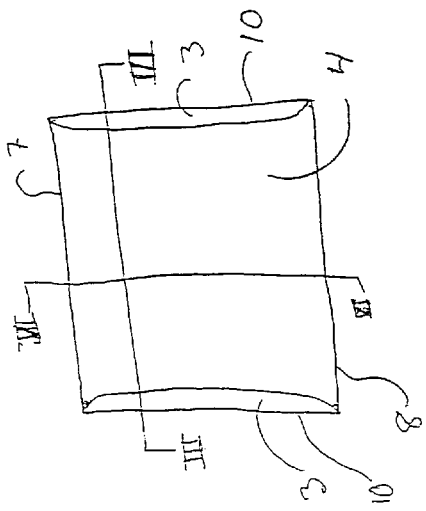
FIG. 5 is a cross section of a pad showing two modes for adhesively binding the liquid permeable layer to the liquid impermeable support layer.

An embodiment of the inventive pad is given in FIG. 4 showing fold configuration (C). In this embodiment, the liquid permeable layer 2 is partially draped over the side of the absorbent layer 1, so that a portion of the top surface 4 of the liquid permeable layer 2 is bound by an adhesive strip to a portion of the top surface 5 of the liquid impermeable support layer 3 at the side of the absorbent layer 1, wherein a midpoint of said adhesive strip is at a position along the side of the absorbent pad of at least $1/10^{th}$ the total distance from the bottom to top of the pad as measured in a thickness direction "T". Preferably, the midpoint of said adhesive strip is at a position at least ½ the distance from the bottom to top of the pad as measured in a thickness direction "T".

The inventive pad can have any combination of fold configurations (A), (B) and (C). In a preferred embodiment, the pad has the leading edge 7 and the trailing edge 8 having the same type of fold configuration as the two side edges. In a more preferred embodiment, the pad has the leading edge 7 and the trailing edge 8 having one type of fold configuration and the two side edges 10 have a second type of fold configuration. In a most preferred embodiment, the pad has the leading edge 7 and the trailing edge 8 in fold configuration (A) and the two side edges 10 in fold configuration (B).

The liquid permeable layer can be made of any material so long as it is permeable to both water and oil based liquids. The liquid permeable layer described in U.S. Pat. Appl. No. 2002/0147435 A1 as a "topsheet" may be used in the inventive pad, and the entire disclosure of which is herein incorporated by reference. Preferably this layer is comprised of a non-woven material comprised of polypropylene. In one embodiment, the nonwoven material further comprises at least 20% of viscose and at most 80% of polypropylene. Most preferably, the layer is 100% polypropylene.

The liquid impermeable support layer can be made of any material, so long as it is impermeable to both water and oil based liquids. The support layer described in U.S. Pat. Appl. No. 2002/0147435 A1 as a "backsheet" may be used in the inventive pad, and the entire disclosure of which is herein incorporated by reference. Preferably this layer comprises a polyalkylene. Most preferably, this layer comprises polyethylene.

In the present invention, the adhesive used in the adhesive strip can be of any type as long as it gives sufficient bond strength between the top of the liquid permeable layer and the liquid impermeable support layer so that said layers do not peel during or after absorption of the motor fluid. In order that the liquid impermeable support layer and the liquid permeable layer do not peel during or after absorption of the motor fluid, the adhesive is essentially insoluble in oil and water after the adhesive has set. It is envisioned that a spray adhesive or a viscous glue having a caulk-like consistency can be used. In fold configurations (B) and (C), the adhesive is preferably a spray adhesive. In fold configuration (A), the adhesive is the viscous glue which is applied as beads.

The adhesives can be physically or chemically bonding adhesives. Any conventional adhesive can be used, such as animal-product based adhesive (casein, glutin), plant-based adhesives (starch, dextrin, cellulose ether) or synthetic adhesives (polyacrylic acid-based, polyvinylalcohol-based, polyvinylpyrrolidone-based) and hot-melt adhesives. The adhesive composition described in U.S. Pat. No. 6,063,981 may be used in the inventive pad, and the entire disclosure of which is herein incorporated by reference.

The absorbent pad can be shaped to fit any particular application, but for ease of production is preferably square or rectangular. The area of the absorbent pad is preferably less than 6200 cm$^2$, more preferably 525–6000 cm$^2$. The length of the sides of the pad is 15–100 cm, preferably 35–90 cm. Preferably the pad has a width of 35–65 cm and a length of 55–95 cm. The thickness "T" of the absorbent pad is 0.25–10 cm, preferably 0.5–5 cm, and most preferably 0.7–2.6 cm.

In the event that the collection area for the motor fluids is larger than a single pad, it is envisioned that the pads can be placed next to each other to cover the area. In order to keep the pads from separating, and for ease of removal, the bottom (the liquid impermeable side) of the adjacent pads can be taped to one another with any type of adhesive tape, including adhesive contact paper.

In an embodiment of the invention, the absorbent pads are constructed on an assembly line. In a pad forming section of the assembly line, the bottom support layer is rolled out as a continuous sheet which is wide enough to form a single pad. On the top surface of the bottom support layer is placed intermittently, a mass of the absorbent material in a quantity sufficient to be used in a single absorbent pad. In an embodiment of the inventive process, an adhesive (preferably a hot melt adhesive) is applied to the top surface of the bottom support layer before adding the mass of absorbent material. In another embodiment of the inventive process, the adhesive is applied to the top surface of the bottom support layer and thereon is placed a carrier tissue and on the top surface of the carrier tissue is applied an adhesive (preferably a hot melt adhesive) upon which is added the mass of absorbent material. Optionally, an adhesive (preferably a hot melt adhesive) is placed on top of the mass of absorbent material. In order to form the leading edge 7 of one pad and the trailing edge 8 of an adjacent pad on the assembly line, a cut is made in a line perpendicular to the direction of motion of the continuous sheets and between the intermittent absorbent material masses. The pads are then forwarded to a lamination section where the top liquid permeable layer is rolled out as a continuous sheet (wide enough to form a single pad) to cover the intermittent absorbent material and the bottom support layer. An adhesive (preferably a spray adhesive) is applied to the top surface of the top liquid permeable layer at or near the sides running parallel with the direction of motion of the pad on the assembly line. The pads are then forwarded to a fold-over section where the folds are made. Where a (B) or (C) type fold configuration is to be made, the bottom support layer is folded over to contact the adhesive at or near the edge of the top surface of the top liquid permeable layer. Where an (A) type fold configuration is to be made, the bottom surface of the top liquid permeable layer is contacted with an adhesive at or near the edge of the top surface of the bottom support layer. The continuous sheet of the top surface layer is then cut along the leading edge 7 and the trailing edge 8 of the pad to form individual pads; however, it is envisioned that at least two pads can be connected by not cutting sheets between the intermittent absorbent material masses.

The absorbent material layer can be of any known in the diaper art. Examples of the absorbent materials useful in the present invention are disclosed in U.S. Pat. Nos. 5,549,590; 5,149,335; 4,826,497; 4,381,783; 4,418,163; 4,286,082; 6,376,011; 6,387,495 B1; and 6,284,362 B1, the disclosures of which are all incorporated by reference herein.

In an embodiment of the invention, the absorbent material layer comprises (a) an absorbent polymer, (b) an inorganic material and (c) a water-insoluble hydrophilic fibrous material. The absorbent polymer (a) and the inorganic material (b) have the property of absorbing and retaining the motor fluid. The water-insoluble hydrophilic fibrous material (c) has the property of wicking the motor fluid throughout the absorbent material layer thereby maximizing the access of the absorbent polymer (a) and the inorganic material (b) to the motor fluid.

Preferably, the absorbent material layer comprises 0.5–15 wt % (a), 0.1–5 wt % (b) and 80–99.4 wt % (c) based on the total weight of the (a)+(b)+(c). More preferably, the absorbent material layer comprises 1–10 wt % (a), 0.25–3 wt % (b) and 87–98.75 wt % (c) based on the total weight of the (a)+(b)+(c). Most preferably, the absorbent material layer comprises 2–5 wt % (a), 0.5–2 wt % (b) and 93–97.5 wt % (c) based on the total weight of the (a)+(b)+(c). When the content of the absorbent polymer (a) is less than 0.5 wt % and the inorganic material (b) is less than 0.1 wt %, the rate of absorption and absorbing power of the absorbent material layer are unfavorably small. It is preferred not to exceed 15 wt % of absorbent polymer (a) and 5 wt % of the inorganic material (b), since the overall cost of the product increases without substantially increasing the absorbency properties. When the content of the water-insoluble hydrophilic fibrous material (c) is less than 80 wt %, the effects on motor fluid guiding properties and rate of absorption of the absorbent material layer are small, while when the content exceeds 99.4 wt %, the capacity of absorption of the motor fluid is small and the purpose of the present invention is not attained. The ratio of the water-insoluble inorganic material to the water-insoluble hydrophilic fibrous material may be varied at will in the above-mentioned range according to the kind of motor fluid to be absorbed and the particular application.

The method of combining the absorbent polymer (a), inorganic material (b) and the water-insoluble hydrophilic fibrous material can be any known in the art. The components (a)–(c) can be combined as a slurry in a solvent. Preferably, the solvent is water. More preferably the solvent is added to the absorbent polymer (a) and the swelled absorbent polymer (a) is combined with components (b) and (c) in a swelled state in an amount of less than 70 parts by weight based on the total weight of components (a)–(c), and even more preferably, less than 50 parts by weight based on the total weight of components (a)–(c). Most preferably, components (a)–(c) are combined with essentially no added water by physically mixing the components, and there is no step for bonding components (b) and/or (c) to component (a).

The absorbent polymer (a) useful for the present invention is generally any polymer having water absorbency. The polymer is optionally crosslinked. Examples of such a polymer include a polyacrylate and a crosslinking product thereof, polyethylene oxide, polyvinyl pyrrolidone, crosslinked sulfonated polystyrene and polyvinylpyridine, a saponified starch-poly(meth)acrylonitrile graft copolymer, a starch-poly(meth)acrylic acid (and its salt) graft copolymer (and its crosslinking product), a product obtained by a reaction of polyvinyl alcohol with maleic anhydride (and its salt), and a hydrolyzate of a starch-poly(meth)acrylate graft copolymer or mixtures thereof. Further, polyvinyl alcohol sulfonate, a polyvinyl alcohol-acrylic acid graft copolymer, etc. may also be employed. The preferred polymer materials include hydrolyzed starch-acrylonitrile graft copolymers, partially neutralized starch-acrylonitrile graft copolymers, starch-acrylic acid graft copolymers, partially neutralized starch-acrylic acid graft copolymers, saponified vinyl acetate-acrylic ester copolymers, hydrolyzed acrylonitrile or acrylamide copolymers, slightly network crosslinked products of any of the foregoing copolymers, partially neutralized polyacrylic acid, and slightly network crosslinked products of partially neutralized polyacrylic acid. Examples of these polymer materials are disclosed in U.S. Pat. Nos. 3,661,875; 4,076,663; 4,093,776; 4,666,983; and 4,734,498, the disclosures of which are all incorporated by reference herein. The polymer materials may be slightly network crosslinked products of partially neutralized polyacrylic acids and starch derivatives therefrom. The polymers may comprise from about 50 to about 95%, preferably about 75%, neutralized, slightly network crosslinked, polyacrylic acid (e.g., poly (sodium acrylate/acrylic acid)).

The absorbent polymer (a) may form a hydrogel, such as alkali metal salts of polyacrylic acids, polyacrylamides, polyvinyl alcohol, ethylene maleic anhydride copolymers, polyvinylethers, hydroxypropylcellulose, polyvinylmorpholinone; and polymers and copolymers of vinyl sulfonic acid, polyacrylates, polyacrylamides, polyvinylpyridine, and the like. Other suitable polymers include hydrolyzed acrylonitrile grafted starch, acrylic acid grafted starch, and isobutylene maleic anhydrides copolymers and mixtures thereof. The hydrogel polymers are preferably lightly crosslinked to render them essentially water insoluble.

The most preferred absorbent polymer is a mixture of an acrylic acid-vinyl alcohol copolymer (CAS Numbers 27599-56-0) and a polyvinyl alcohol (CAS Number 9002-89-5).

These polymers may be used in any combination of two or more. The absorbent polymer (a) can be in the form of powder, particles, fibers, flakes, granules, mass, and/or sheet, and can be produced by any method. The absorbent layer of the present invention can be produced from a polymer in any of the above-mentioned forms. When the polymer is used in a powdery or granular form, it is preferred that the particle diameter be 10 to 3000 microns, preferably 15 to 1000 microns.

The inorganic material (b) to be used in the present invention should be capable of absorbing nonaqueous liquids. Any inorganic material meeting this criteria can be used in the present invention. Examples of the inorganic material used in the present invention include perlite, alumina, silica, titanium dioxide, talc, zirconia, calcium phosphate, barium phosphate, calcium sulfate, clay, silicic acid, diatomaceous earth, bentonite, activated carbon, zeolite, kaolin, acid clay, activated clay, vermiculite, and other metal oxides. Perlite (Registry No. 93763-70-3, manufactured by Instazorb International Inc.), alumina, silica, zeolite, montmorillonite group clay (bentonite), and kaolinite group clay (kaolin) are particularly preferable, with perlite being most preferred.

The water-insoluble hydrophilic fibrous material (c) useful for the present invention include materials having wettability and liquid guiding properties characteristic of water-insoluble fibrous materials, such as wood pulp, cellulose powder, rayon, vinylon, cotton, wool, and cellulose acetate.

The use of bleached fluff wood pulp is particularly preferable from a cost perspective. Further, in order to impart functions such as immobilization through fusion, hydrophobic fibrous materials, such as polyester, polyethylene, polypropylene, polyvinyl chloride, acrylics, and nylon, can be also used in the form of a mixture with these water-insoluble hydrophilic fibrous materials. The fibrous material may be used in any form of long fiber, short fiber and fine powder. The fiber length is preferably 50 mm or less, more preferably 40 mm or less.

In an embodiment of the invention, the absorbent pad can be made more environmentally friendly by adding to the absorbent material layer an agent for catalyzing the decomposition of the motor/engine oil. This embodiment aids in the disposal of the used pad, since the used absorbent pad containing decomposed motor/engine oil can be disposed of in land-fills. The type of agent can be any known, but is preferably an enzyme-based agent.

INDUSTRIAL APPLICABILITY

In the running and maintenance of motors/engines, leaking oil and other fluids are difficult to collect. The inventive absorbent pad can be positioned to collect the fluids originating from motors/engines or the inventive absorbent pads can be used to clean surfaces soiled with leaked fluids from motors/engines.

What is claimed is:

1. An array of absorbent pads, comprising at least two absorbent pads connected together side by side, wherein each absorbent pad comprises:
   a bottom liquid impermeable support layer, a layer of absorbent material and a top liquid permeable layer, wherein a portion of the top liquid permeable layer is bonded to a portion of the bottom liquid impermeable support layer with an adhesive strip thereby enclosing the absorbent material layer,
   wherein there is an adhesive layer between the top liquid permeable layer and the absorbent material layer, and an adhesive layer between the bottom liquid impermeable support layer and the absorbent material layer.

2. The array of absorbent pads according to claim 1, wherein the absorbent material layer comprises (a) an absorbent polymer, (b) an inorganic material and (c) a water-insoluble hydrophilic fibrous material;
   wherein at least one side of the absorbent pad has a fold configuration selected from the group consisting of (A), (B) and (C), wherein
   fold configuration (A) has an adhesive strip binding a portion of a bottom surface of the liquid permeable layer and a portion of a top surface of the liquid impermeable support layer,
   fold configuration (B) has the liquid impermeable support layer folded around a side of the absorbent material layer so a portion of a top surface of the liquid impermeable support layer is bound with an adhesive strip to a portion of a top surface of the liquid permeable layer,
   fold configuration (C) has the liquid permeable layer partially draped over the side of the absorbent layer, and a portion of the top surface of the liquid permeable layer is bound wit an adhesive strip to a portion of the top surface of the liquid impermeable support layer, wherein a midpoint of said adhesive strip is at a position along the side of the absorbent pad of at least $\frac{1}{10}^{th}$ the total distance from bottom to top of the pad as measured in a thickness direction T.

3. The array of absorbent pads according to claim 2, wherein all four sides of the absorbent pad are in fold configuration (B).

4. The array of absorbent pads according to claim 1, wherein the absorbent material layer comprises 0.5–15 wt % absorbent polymer (a), 0.1–5 wt % inorganic material (b) and 80–99.4 wt % water-insoluble hydrophilic fibrous material (c) based on the total weight of the (a)+(b)+(c).

5. The array of absorbent pads according to claim 4, wherein the absorbent polymer (a) is a mixture of an acrylic acid-vinyl alcohol copolymer and a polyvinyl alcohol the inorganic material (b) is perlite, and the water-insoluble hydrophilic fibrous material (c) is a bleached fluff wood pulp.

6. The array of absorbent pads according to claim 1, wherein the absorbent material layer comprises 2–5 wt % absorbent polymer (a), 0.5–2 wt % inorganic material (b) and 93–97.5 wt % water-insoluble hydrophilic fibrous material (c) based on the total weight of the (a)+(b)+(c).

7. The array of absorbent pads according to claim 1, wherein the absorbent material layer further comprises an agent for catalyzing the decomposition of motor/engine oil.

8. The array of absorbent pads according to claim 7, wherein the agent is enzyme-based.

9. Method of absorbing a fluid comprising contacting the fluid with an array of absorbent pads according to claim 1.

10. The method of absorbing a fluid according to claim 9, wherein the fluid is a motor fluid.

11. The method of absorbing a motor fluid according to claim 9, wherein the absorbent material layer comprises (a) an absorbent polymer, (b) an inorganic material and (c) a water-insoluble hydrophilic fibrous material;
    wherein at least one side of the absorbent pad has a fold configuration selected from the group consisting of (A), (B) and (C), wherein
    fold configuration (A) has an adhesive strip binding a portion of a bottom surface of the liquid permeable layer and a portion of a top surface of the liquid impermeable support layer,
    fold configuration (B) has the liquid impermeable support layer folded around a side of the absorbent material layer so a portion of a top surface of the liquid impermeable support layer is bound with an adhesive strip to a portion of a top surface of the liquid permeable layer,
    fold configuration (C) has the liquid permeable layer partially draped over the side of the absorbent layer, and a portion of the top surface of the liquid permeable layer is bound with an adhesive strip to a portion of the top surface of the liquid impermeable support layer, wherein a midpoint of said adhesive strip is at a position along the side of the absorbent pad of at least $\frac{1}{10}^{th}$ the total distance from bottom to top of the pad as measured in a thickness direction T.

12. The method of absorbing a motor fluid according to claim 11, wherein the absorbent material layer comprises 0.5–15 wt % absorbent polymer (a), 0.1–5 wt % inorganic material (b) and 80–99.4 wt % water-insoluble hydrophilic fibrous material (c) based on the total weight of the (a)+(b)+(c).

13. The method of absorbing a motor fluid according to claim 12, wherein the absorbent material layer comprises 2–5 wt % absorbent polymer (a), 0.5–2 wt % inorganic material (b) and 93–97.5 wt % water-insoluble hydrophilic fibrous material (c) based on the total weight of the (a)+(b)+(c).

14. The method of absorbing a motor fluid according to claim 11, wherein two opposite sides of the absorbent pad are in a first fold configuration and two opposite sides of the absorbent pad are in a second fold configuration.

15. The method of absorbing a motor fluid according to claim 9, wherein there is an adhesive layer between the top liquid permeable layer and the absorbent material layer, and an adhesive layer between the bottom liquid impermeable support layer and the absorbent material layer.

16. The method of absorbing a motor fluid according to claim 9, wherein the absorbent material layer further comprises an agent for catalyzing the decomposition of motor/engine oil.

17. A method of preparing an array of absorbent pads according to claim 1, wherein the absorbent material layer comprises (a) an absorbent polymer, (b) an inorganic material and (c) a water-insoluble hydrophilic fibrous material;
said method comprising a step of forming at least one fold configuration selected from the group consisting of (A), (B) and (C) at a side of the absorbent pad, wherein
fold configuration (A) is formed by binding a portion of a bottom surface of the liquid permeable layer and a portion of a top surface of the liquid support layer with an adhesive strip,
fold configuration (B) is formed by folding the liquid impermeable support layer around a side of the absorbent material layer and binding a portion of a top surface of the liquid impermeable support layer with an adhesive strip to a portion of a top surface of the liquid permeable layer, and
fold configuration (C) is formed by partially draping the liquid permeable layer over the side of the absorbent layer, and binding a portion of the top surface of the liquid permeable layer with an adhesive strip to a portion of the top surface of the liquid impermeable support layer, wherein a midpoint of said adhesive strip is at a position along the side of the absorbent pad of at least $1/10^{th}$ the total distance from bottom to top of the pad as measured in a thickness direction T.

18. An array of absorbent pads, comprising at least two absorbent pads connected together side by side, wherein each absorbent pad comprises:
a bottom liquid impermeable support layer, a layer of absorbent material and a top liquid permeable layer, wherein a portion of the top liquid permeable layer is bonded to a portion of the bottom liquid impermeable support layer with an adhesive strip thereby enclosing the absorbent material layer,
wherein the absorbent material layer comprises (a) an absorbent polymer, (b) an inorganic material and (c) a water-insoluble hydrophilic fibrous material;
wherein at least one side of the absorbent pad has a fold configuration selected from the group consisting of (A), (B) and (C), wherein
fold configuration (A) has an adhesive strip binding a portion of a bottom surface of the liquid permeable layer and a portion of a top surface of the liquid impermeable support layer,
fold configuration (B) has the liquid impermeable support layer folded around a side of the absorbent material layer so a portion of a top surface of the liquid impermeable support layer is bound with an adhesive strip to a portion of a top surface of the liquid permeable layer,
fold configuration (C) has the liquid permeable layer partially draped over the side of the absorbent layer, and a portion of the top surface of the liquid permeable layer is bound with an adhesive strip to a portion of the top surface of the liquid impermeable support layer, wherein a midpoint of said adhesive strip is at a position along the side of the absorbent pad of at least $1/10^{th}$ the total distance from bottom to top of the pad as measured in a thickness direction T,
wherein two opposite sides of the absorbent pad are in a first fold configuration and two opposite sides of the absorbent pad are in a second fold configuration.

19. The array of absorbent pads according to claim 18, wherein the first fold configuration is fold configuration (A) and the second fold configuration is fold configuration (B).

20. The array of absorbent pads according to claim 18, wherein said at least two absorbent pads are connected through a continuous bottom liquid impermeable support layer.

* * * * *